April 21, 1970 L. F. VAN BUSKIRK 3,508,130
DIGITAL MOTOR
Filed Feb. 23, 1968
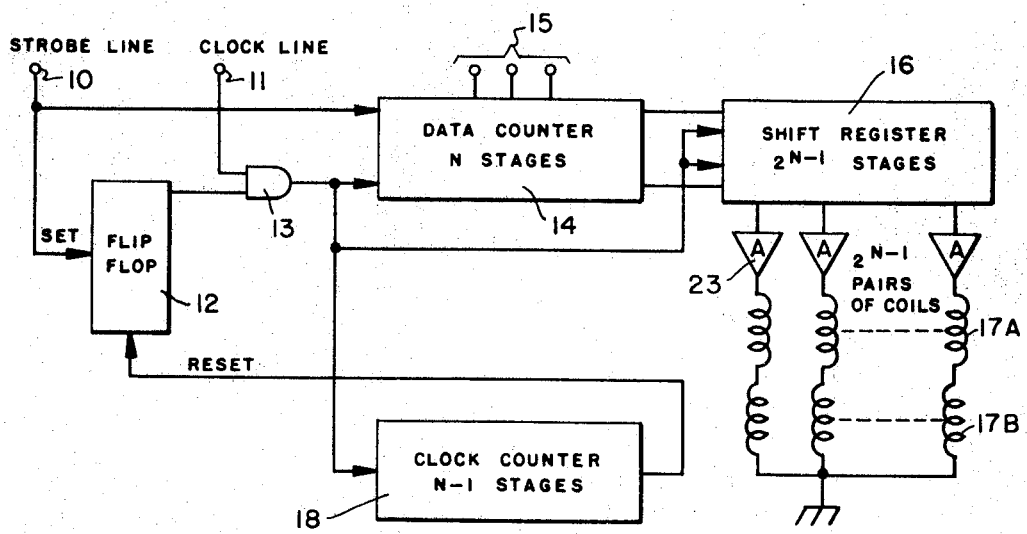
FIG. 1.
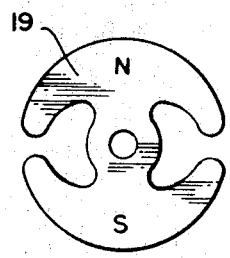
FIG. 2-A.
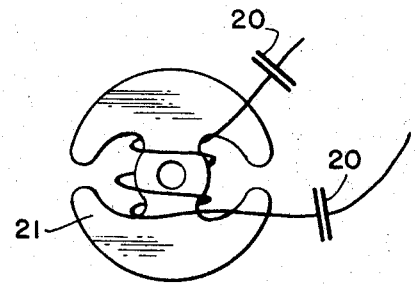
FIG. 2-B.
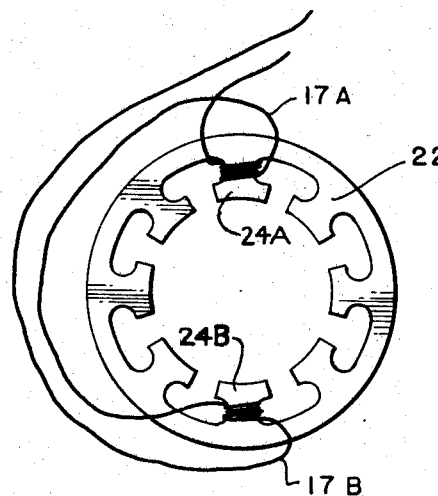
FIG. 3.
*INVENTOR.*
LYMAN F. VAN BUSKIRK
BY
ROY MILLER
ATTORNEY.

United States Patent Office 3,508,130
Patented Apr. 21, 1970

---

3,508,130
DIGITAL MOTOR
Lyman F. Van Buskirk, Ridgecrest, Calif., assignor to the United States of America as represented by the Secretary of the Navy
Filed Feb. 23, 1968, Ser. No. 707,493
Int. Cl. H02p 7/28
U.S. Cl. 318—138          2 Claims

ABSTRACT OF THE DISCLOSURE

A digital controlled shaft rotating device which will seek a discrete position in response to a binary command.

---

Background of the invention

It is desirable to have a device which will seek a discrete position in response to a digital command, as opposed to a digital encoder which emits a binary word in response to a discrete position.

Stepper motors in combination with sophisticated digital logic have provided discrete shaft positions in response to digital commands, however, such stepper motors must advance step-by-step to a given position. An improvement over the stepper motor is to use a digital encoder to feed back shaft position information to a digital-to-analog converter which in turn drives a servo-torquer motor to the desired shaft position. The digital encoder system suffers from the inherent limitations which occur in any system requiring digital-to-analog conversion, although this system will immediately turn to a commanded position without advancing step-by-step.

Summary of the invention

In accordance with the present invention, a motor stator is provided with a plurality of individual coils, any one-half of which are always energized "north," and the remaining half of which are always energized "south." A rotor is composed of a permanent magnet shaped to provide for nearly 180 degrees of active surface for each pole.

The most significant bit of a binary word command, which is entered on a binary counter, is entered onto a shift register as a clock pulse causes the binary counter to advance. The output of each flip-flop within the shift register drives an operational amplifier which, in response to the particular state of each flip-flop, drives a pair of stator coils.

The permanent magnet rotor turns to follow the magnetic field established by the stator coils.

Brief description of the drawings

FIG. 1 is a block diagram of a preferred embodiment of the present invention;

FIG. 2-A is a diagrammatic representation of a permanent magnet rotor of the motor used in conjunction with the system shown in FIG. 1;

FIG. 2-B is a diagrammatic representation of a wound rotor which is alternatively usable with the system shown in FIG. 1.

FIG. 3 is a diagrammatic representation of the stator of the motor used in conjunction with the system shown in FIG. 1.

Description of the preferred embodiment

Referring to FIG. 3, stator 22 is shown having eight pole pieces. A pair of coils 17A and 17B are shown wound around pole pieces 24A and 24B so that when the coils are energized, pole pieces 24A and 24B are of opposite polarity.

The digital circuitry is arranged to energize any four adjacent pole pieces to the same polarity, and the other four adjacent pole pieces to the opposite polarity. Thus, rotor 19 as shown in FIG. 2A, will align its "north" pole directly opposite the four pole pieces energized "south," and will align its "south" pole directly opposite the four pole pieces energized "north."

FIG. 2B shows a wound rotor 21 which receives excitation to its coil via slip rings 20. An advantage of wound rotor 21 over permanent magnet rotor 19 is that wound rotor 21 may be driven by either alternating or direct current, and permanent magnet rotor 19 may be driven only by direct current.

When operating an eight pole piece stator, as shown in FIG. 3, shift register 16 is required to have four stages; thus four operational amplifiers 23 and four pairs of coils such as 17A and 17B are also required.

To produce the requisite outputs at each stage of shift register 16 an input binary word 15 is entered onto data counter 14 by a pulse on strobe line 10, which permits entry onto data counter 14 of input binary word 15, and simultaneously sets flip-flop 12. The output of flip-flop 12 enables AND gate 13 and allows pulses from input 11 to be coupled through AND gate 13 to data counter 14 and clock counter 18.

A three bit binary word 15 is required to produce the requisite outputs for eight pole piece stator 22 shown in FIG. 3. Shift register 16 will thus have four stages and clock counter 18 will have two stages.

There are eight possible words which result from a three bit binary sequence:

000=0
001=1
010=2
011=3
100=4
101=5
110=6
111=7

As the data counter counts, the digital circuitry is arranged so that the most significant bit of input binary word 15 is entered into shift register 16 at the first clock pulse through AND gate 13. The state, "one" or "zero," of the most significant stage of data counter 14 will be entered on shift register 16 with each succeeding clock pulse through AND gate 13.

Clock counter 18, which has two stages for a three bit binary word 15 will cycle through one full count every four clock pulses. Flip-flop 12 is arranged to reset the next pulse after clock counter 18 counts on full cycle, which is a count of four clock pulses. When reset, flip-flop 12 disables AND gate 13 and stops data counter 14 and clock counter 18 from operating.

Since shift register 16 has four stages, one full count of clock counter 18 will clear the register of its prior information.

Assume an input binary word 010=2. Counting four times:

| Output of Flip-Flop 12 | Output of Data Counter 14 | Output of Each State of a Four Stage Shift Register ⟶ |
|---|---|---|
| Set | 0 | Overflow |
| Set | 0 | 0XXX |
| Set | 1 | 00XX |
| Set | 1 | 100X |
| Reset | | 1100 |

Where X indicates previous data loaded on shift register. Thus an input word of 010 will produce an output of 1100; and:

| Input Binary Word 15 | Output of Each State of a Four Stage Shift Register |
|---|---|
| | → Overflow |
| 0=000 | 0000 |
| 1=001 | 1000 |
| 2=010 | 1100 |
| 3=011 | 1110 |
| 4=100 | 1111 |
| 5=101 | 0111 |
| 6=110 | 0011 |
| 7=111 | 0001 |

The output of each stage of shift register 16 drives an amplifier, such as amplifier 23, which energizes coil pairs, such as coil pairs 17A and 17B in accordance with the output state of each stage.

The output of each stage of shift register 16 will be either a binary "one" or a binary "zero." Coil pairs such as 17A and 17B will be energized to produce corresponding "north"–"south" or "south"–"north" pole pieces on stator 22 dependent upon whether a "one" or a "zero" is present at the input to the respective amplifier.

The invention described herein may be manufactured and used by or for the Government of the United States of America for governmental purposes without the payment of any royalties thereon or therefor.

What is claimed is:

1. An apparatus which will seek a discrete position in response to a binary command comprising:
   rotor means adapted to have a "north" and "south" magnetic pole;
   a plurality of pole pieces surrounding said rotor means;
   a plurality of stator coil pairs associated with said pole pieces for selectively causing selected pairs of said pole pieces to be magnetized;
   a first counter adapted to receive a binary command word;
   a shift register having multiple stages operatively connected to said counter and adapted to receive the most significant bit from the first counter;
   clock means operatively connected to said counter and said shift register adapted to cause said counter to count through a predetermined sequence and to cause the shift register to shift;
   an AND gate for gating the pulses from said clock means;
   flip-flop means for enabling and disabling said AND gate when the flip-flop is set and reset respectively;
   strobe means for setting said flip-flop and simultaneously setting the data on the first counter; and
   a second counter adapted to count through a predetermined sequence and then to cause the flip-flop to reset;
   so that the output of each stage of the shift register is operatively connected to said stator coils for controlling the current flow through the stator coils and thereby controlling the magnetic state of said associated pole pieces.

2. The apparatus as set forth in claim 1 wherein the means for controlling the current flow through the stator coils comprises:
   means for determining the output state of each stage of said shift register;
   means for passing current in a first direction through each pair of stator coils in response to a "one" output state of each stage of the shift register; and
   means for passing current oppositely to said first direction through each pair of stator coils in response to a "zero" output state of each stage of the shift register.

References Cited

UNITED STATES PATENTS

| 3,297,927 | 1/1967 | Blakeslee et al. | 318—138 |
| 3,304,480 | 2/1967 | Ko | 318—254 XR |
| 3,324,467 | 6/1967 | Crow et al. | 318—138 XR |
| 3,354,367 | 11/1967 | Stockebrand | 318—138 |
| 3,374,410 | 3/1968 | Cronquist et al. | 318—138 XR |
| 3,435,314 | 3/1969 | Bradley et al. | 318—138 |

GLEN R. SIMMONS, Primary Examiner